United States Patent [19]
Durfee, Jr.

[11] Patent Number: 5,149,234
[45] Date of Patent: Sep. 22, 1992

[54] SPOT-WELD REMOVING TOOL

[75] Inventor: LaVerne R. Durfee, Jr., DeWitt, Nebr.

[73] Assignee: Unibit Corporation, DeWitt, Nebr.

[21] Appl. No.: 746,790

[22] Filed: Aug. 16, 1991

[51] Int. Cl.⁵ .............................................. B23B 51/00
[52] U.S. Cl. ...................................... 408/211; 408/199
[58] Field of Search ................ 408/211, 229, 212–214, 408/715, 199

[56] References Cited

U.S. PATENT DOCUMENTS 4,968,193  11/1990  Chaconas et al. ................... 408/211

FOREIGN PATENT DOCUMENTS 2617753  1/1989  France ................... 408/213

Primary Examiner—Larry I. Schwartz
Assistant Examiner—R. L. Schultz

[57] ABSTRACT

A cutting tool consists of a cutting body extending from a front end to a rear end and defined by at least an exterior surface. A shank is connected to the cutting body at the rear end. The cutting body is provided with a slightly concave base surface positioned at the front end. A pilot unit extends outwardly from the base surface and is defined by at least an outside surface thereof. First and second surfaces extend inwardly from the exterior surface of the cutting body and intersect each other to form a flute. The first surface, second surface and the flute extend into the pilot unit. A cutting edge of the cutting tool is formed at the intersection of the first surface with the base surface of the cutting body.

9 Claims, 4 Drawing Sheets

SPOT-WELD REMOVING TOOL

FIELD OF THE INVENTION

This invention relates generally to metal-working tools, and more particularly to a rotary cutting tool for disconnecting metallic members which are originally joined together by one or more spot-welds.

BACKGROUND OF THE INVENTION

This invention is best described with reference to spot-weld removal operations. The task of removing spot-weld interconnections between two flat members is typically time-consuming and difficult. Spot-weld removing operations are regularly and frequently practiced in a variety of situations, most notably in vehicle panel replacement in auto body shops.

In repairing and refinishing collision damaged sheet metal parts of automotive vehicles, such as the body panels and fenders thereof, it is often necessary to remove a damaged outside panel from the vehicle in order to straighten or otherwise recondition the same. When the sheet metal panels are joined together by spot-weld, the damaged outside panel is typically separated from the undamaged outside panel either by drilling a hole of sufficient diameter through both panels so that the entire spot-weld portion of the panels are removed, or by splitting the spot-welded seam apart by driving a thin sharp chisel between the two panels.

However, in removing spot-weld interconnections, it is usually highly desirable to remove the metal of the damaged outside panel at the location of a spot-weld interconnection without removing any of the metal below the interface of the damaged and undamaged panels. Invasion of metal coincident with the undamaged inside panel is undesirable. Removal of the metal from the damaged outside panel is sufficient to disconnect the panels, provided the metal removal is at the weld location.

Extremely careful tool manipulation and use is necessary to achieve removal of the outside panel member without invading the undamaged inside panel. It is this which makes the operation difficult and time-consuming.

Among other things, it is often difficult to control the depth of tool movement into the interconnected flat panels. The inside undamaged panel is usually invaded unless extreme care is taken in the operation. The operator is often required to guess the thickness (gauge) of the damaged panel, and even then is unable to properly limit the metal removal.

Specialized tools have been developed to aid in the removal of spot-weld portions in sheet metal work. Among these, is a tool disclosed by Hougen U.S. Pat. No. 3,104,564 teaching a complicated article for separation of spot-weld panels. Another expensive, complicated and unreliable spot-weld removing tool is disclosed by Perrone U.S. Pat. No. 4,735,528.

SUMMARY OF THE INVENTION

The illustrative embodiment of the present invention provides a spot-weld removing tool having a cutting body extending from a front end to a rear end and defined by at least an exterior surface thereof.

The cutting body has a slightly concave base surface positioned at the front end.

A pilot unit extends outwardly from the base surface and is defined by at least an outside surface thereof. A flute is provided which is formed by first and second surfaces extending inwardly from the exterior surface of the cutting body. The first surface, second surface and the flute extend into the pilot arrangement. A main cutting edge of the cutting tool is formed at the intersection of the first surface with the base surface.

In a further embodiment of the invention an auxiliary cutting edge is formed at the intersection of the first surface with the outside surface of the pilot unit.

In another embodiment of the invention the first surface is positioned at an acute angle to a longitudinal axis of the cutting tool.

In a still further embodiment the second surface is positioned at an acute angle to a longitudinal axis of the cutting tool.

BRIEF DESCRIPTION OF THE DRAWINGS

Other advantages and features of the invention are described with reference to exemplary embodiments, which are intended to explain and not to limit the invention, and are illustrated in the drawings in which.

DESCRIPTION OF ILLUSTRATIVE EMBODIMENT

Although a specific embodiment of the invention will now be described with reference to the drawings, it should be understood that the embodiment shown is by way of example only and merely illustrative of but one of the many possible specific embodiments which can represent applications of the principles of the invention. Various changes and modifications, obvious to one skilled in the art to which the invention pertains, are deemed to be within the spirit, scope and contemplation of the invention and are further defined in the appended claims.

Figure 1:
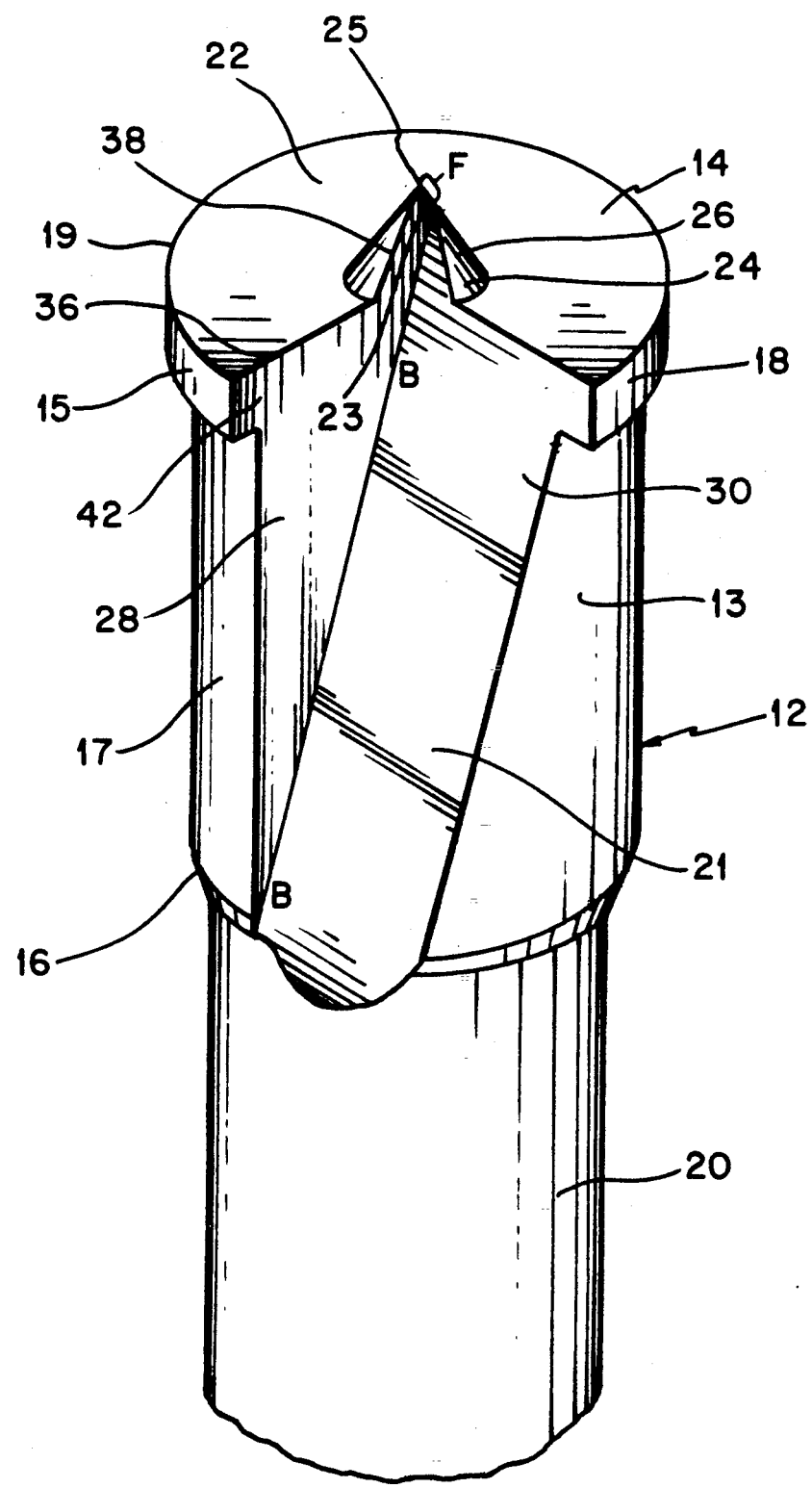
FIG. 1 is a semi-perspective view showing a spot-weld removing tool according to the present invention.
Figure 2:
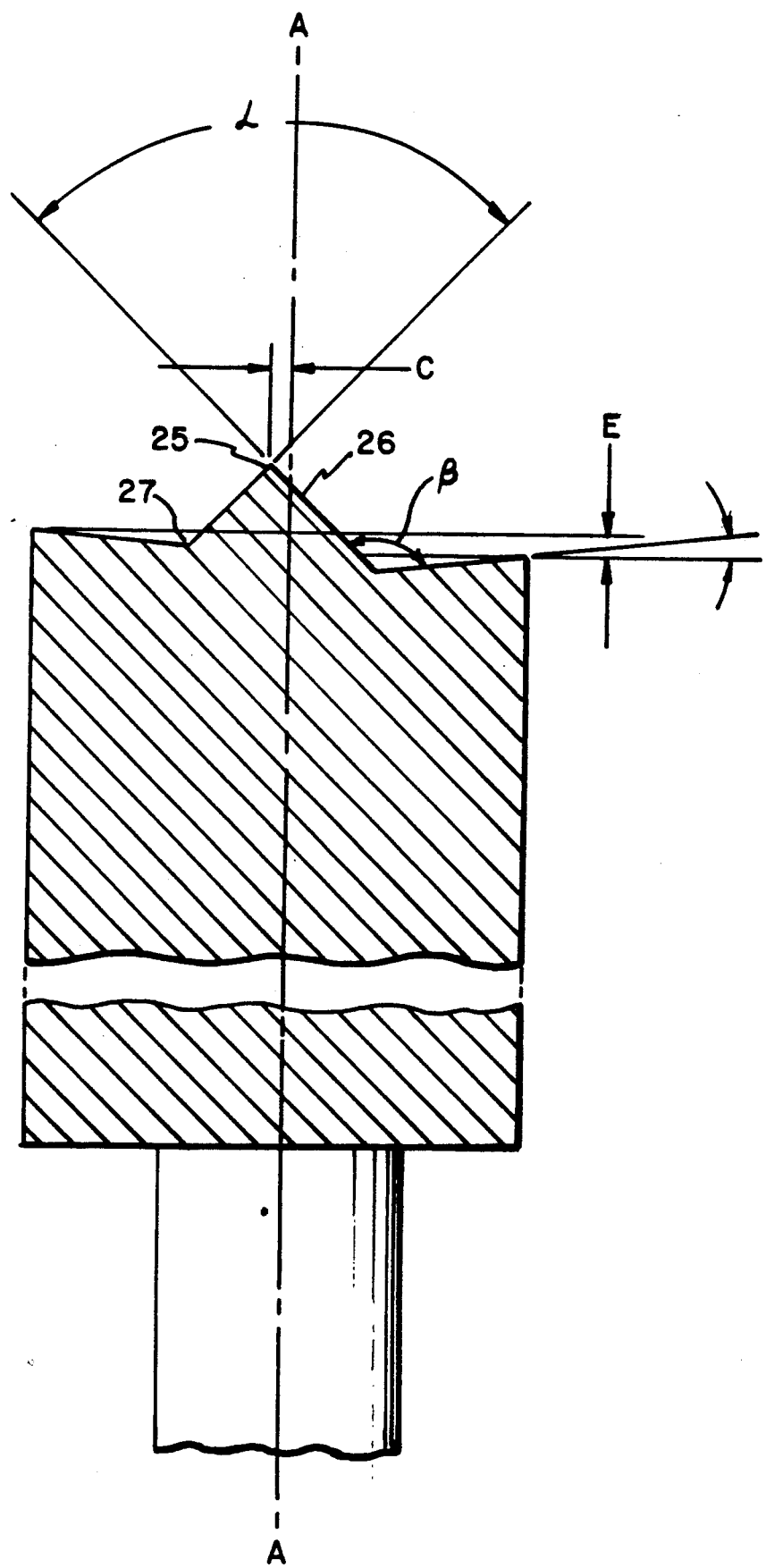
FIG. 2 is a partial cross-sectional view of the front portion of the cutting body (according to sectional line A—A of FIG. 3).
Figure 3:
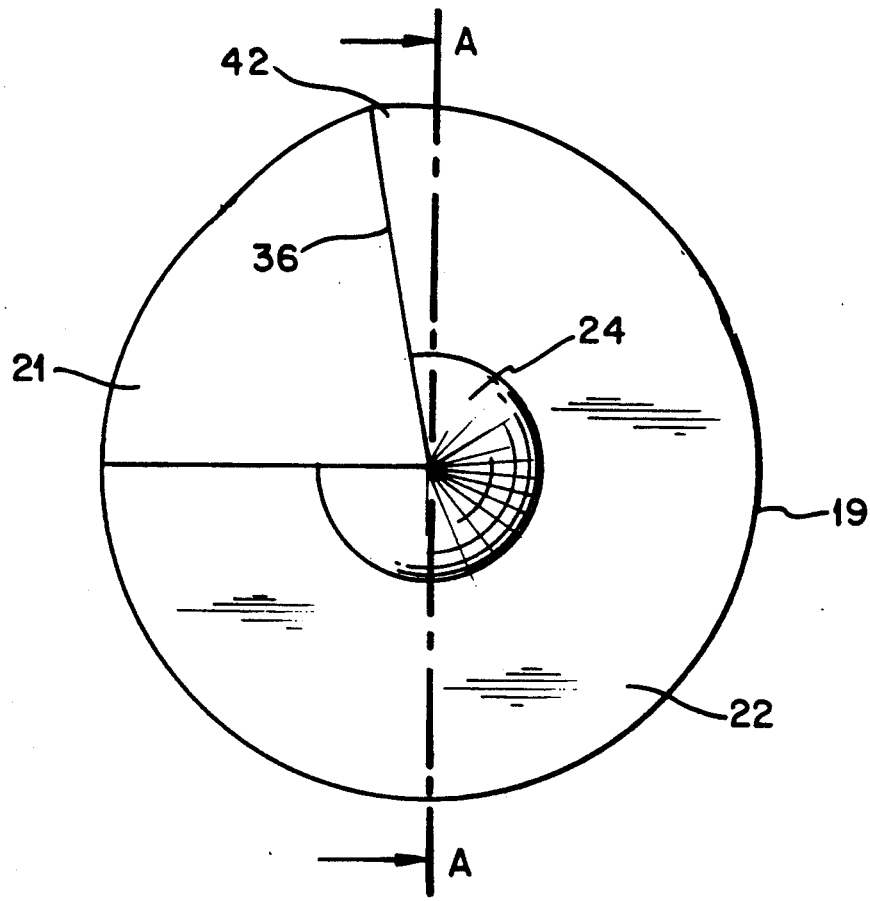
FIG. 3 is a top plan view of FIG. 1.

Referring to FIGS. 1–3, the spot-weld removing tool of the present invention is shown. The tool 10 includes shank 20 and a cutting body 12. The shank 20 is designed to connect the spot-weld removing tool with a conventional rotating device, such as a hand-held drill, etc. The shank may be of any suitable shape for engaging a conventional drill chuck common, for example, $\frac{3}{8}"$ or $\frac{1}{4}"$ drive drills.

Figure 5A:
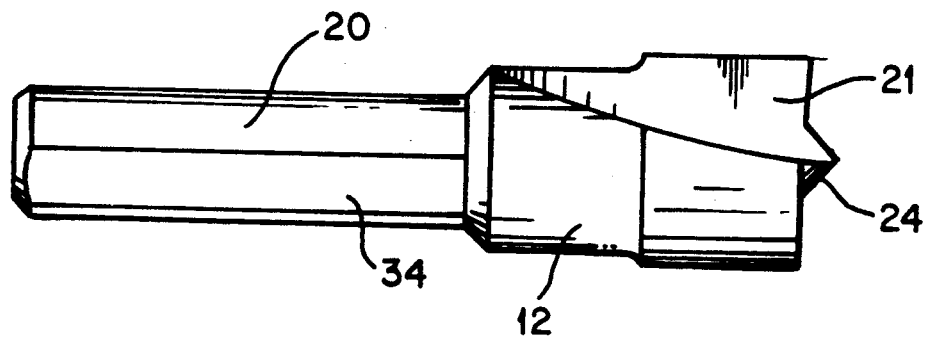
FIGS. 5A and 5B are side elevational views of the invention.
Figure 5B:
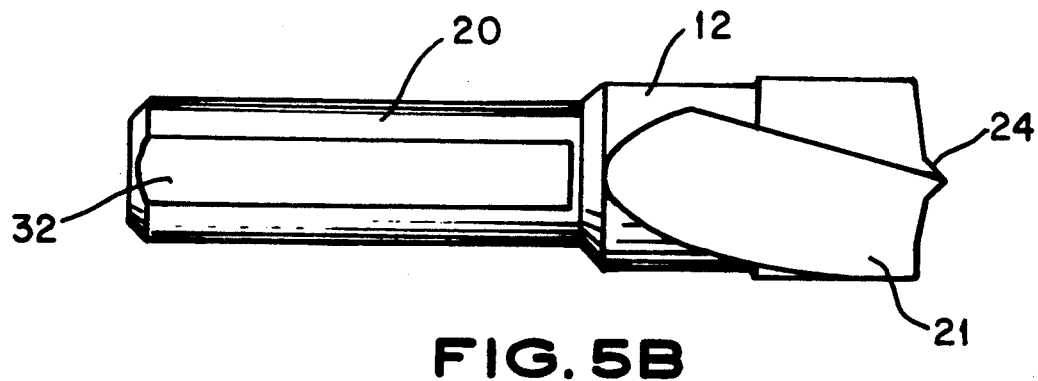

In order to hold the shank firmly in the drill chuck, it is preferable that flat surfaces, tangs, or grooves be provided, preferably flat surfaces. FIGS. 5A and 5B show such flat surfaces 32 and 34 of the illustrated embodiment.

In the illustrative embodiment shown in FIG. 1, 2 and 3, the cutting body having a semi-cylindrical configuration consists of a forward portion 15 and a rearward portion 17 connected to each other. The cutting body 12 extends from a front end 14 to a rear end 16. The forward and rearward portions are defined by at least corresponding exterior surfaces thereof 18 and 13. In the embodiment of FIG. 1, the outside diameter of the forward portion 15 is slightly larger than the outside diameter of the rearward portion 17. However, it should be noted that the cutting body without separation on the forward and rearward portions and having a universal diameter throughout its length is within the scope of the present invention.

The cutting body further includes a base surface 22 situated at the front end 14. In the illustrated embodiment of the invention, the base surface is slightly concave. However, other shapes of the base surface such as a substantially flat base surface are also contemplated. The geometry and function of the base surface will be discussed in full detail hereinbelow. A front edge 19 is formed at the intersection of the base surface 22 and the exterior surface 18 of the forward portion.

A pilot unit or pilot means 24 having an outside surface 26 with a semi-conical configuration extends outwardly from a central part of the base surface 22. In the illustrative embodiment, the cone of the pilot unit at a tip 25 has an angle $\alpha$ of approximately 90° (see FIG. 2). In the alternative embodiments, the angle $\alpha$ might vary from 60° to 120°.

FIG. 2, which is a cross-sectional view of the spot-weld removing tool, illustrates that the pilot unit 24 is positioned eccentrically on the base surface and the cutting body, i.e., the longitudinal axis A—A of the shank 20 and cutting body 12 is located at a predetermined distance C from the tip 25 of the pilot unit. In the illustrative embodiment, the distance C is about 0.015". However, other lengths of the distance C are also permissible.

The cutting body 12 of the present invention is provided with a fluted section 21 which is preferably a single sided flute. Such fluted section 21 extends in the cutting body from the pilot unit 24 and the front end 14 in the direction of the rear end 16. The fluted section 21 is formed by first 28 and second 30 surfaces extending inwardly from the exterior of the cutting body and intersecting each other along line B—B. In the illustrative embodiment of the invention, the first surface 28 is substantially flat and lies within the plane of the longitudinal axis A—A. In the same embodiment, the second surface 30 is curved, so that the first and second surfaces intersect each other at the curved line B—B. It should be noted that the flute section having both surfaces manufactured substantially flat and intersecting each other along a straight line, is within the scope of this invention.

A main cutting edge 36 is defined at the intersection of the first surface 28 and the base surface 22. Since the first and second surfaces extend into the pilot means 24, an auxiliary cutting edge 38 is formed at the intersection of the outside surface 26 of the pilot means 24 and the first surface 28.

A cutting tip 42 is formed at the junction of the exterior surface 18 of the forward portion, the base surface 22 and the first surface 28. FIG. 1 shows that the surfaces 28 and 30 as well as the line of their intersection B—B penetrate into the pilot unit 24. The tip 25 and the point of intersection 23 between the line B—B and the outside surface 26 of the cone are spaced from each other by a short distance F. However, the embodiment of the invention without such distance F, in which the line B—B goes directly to the cutting tip 25, is contemplated.

In the illustrative embodiment, the base surface is designed in such a manner as to provide axial and radial reliefs for the spot-weld removing tool,. The axial relief E is best shown in FIG. 2, wherein a portion of the front edge 19 at one part of the cutting body, i.e., in the area of the cutting tip 42, extends forwardly at a distance E beyond the portion of the front edge which is diametrically opposed to the area of the cutting tip. In use, due to the axial relief, the forwardly extending cutting tip initially engages the metal of the outside panel, without subjecting at that time the rest of the base surface to the frictional engagement with the metal.

The radial relief is best illustrated in FIG. 3 which is a plan view of the front end 14 of the tool showing the base surface 22, the pilot unit 24 and the fluted portion 21. It is shown in this Figure that the area surrounding the cutting tip extends eccentrically and outwardly from the cutting body 12.

The concave area 27 (see FIGS. 2 and 4) is formed at the front end of the cutting body by the base surface 22 and the pilot unit 24 which are juxtaposed to each other at an obtuse angle $\beta$.

In use, the spot-weld removing tool is rotated about the longitudinal axis A—A of the shank. The cutting tip 42, which is eccentrically positioned on the cutting body and the base surface, does not rotate about its own longitudinal axis, but rotates about the longitudinal axis A—A of the shank. As a result, a drilled opening is developed which is symmetrical about the longitudinal axis A—A of the shank. Therefore, an open space exists during the process of drilling between an outside part of the certain portions of the cutting element and inside surface of the drilled hole.

Since a limited part of the cutting body contacts the metal during drilling, the friction between the tool and the metal is substantially reduced. Such reduction of the frictional forces results in the increased longevity of the spot-weld removing tool.

It has been discussed hereinabove, that one of the substantial drawbacks of the spot-weld removing tools of the prior art is their short life span. Many tools currently used in the automotive industry have a short longevity, primarily because they are typically made of a high speed steel. In order to resolve this problem and to increase the life span, the spot-weld removing tool of the illustrated embodiment is entirely made of carbide. The tool may be manufactured of a tungsten carbide such as industry code number C-10, and is preferably composed of micro-fine grain tungsten cobalt carbide. While carbide is recommended, it is within the scope of this invention to use other materials having characteristics similar or exceeding carbide.

Figure 4:
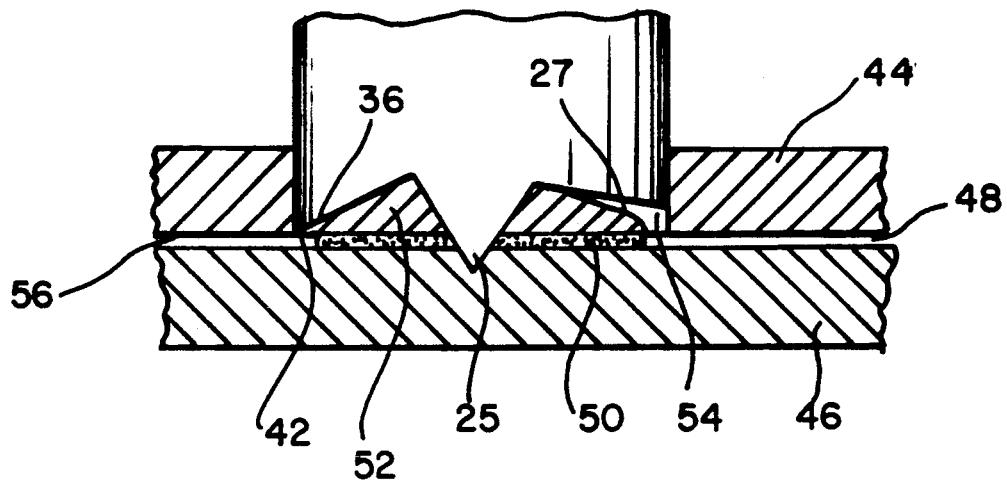
FIG. 4 is a partial cross-sectional view showing application of the spot-weld removing tool to the inner and outer panels interconnected by the spot-weld.

Operation of the spot-weld removing tool is best illustrated in FIG. 4, which shows the outside panel 44 to be connected to the inside panel 46 by the spot-weld 50. A dimple or slight penetration into the exterior of the material of the outside panel 44 could be placed in the area which is being drilled. Then, the tip 25 of the pilot unit is placed therein, so at least a portion of the pilot unit rotates within the dimple, providing stability of the tool during its initial operation. In view of the eccentrical positioning of the pilot tip 25 on the base surface, during the initial drilling, an oversized pilot hole is quickly produced providing additional stability for the conical surface of the pilot unit. As the tool penetrates deeper into the metal, such penetration will prevent the tool from skipping out from the aperture being drilled. This is only needed until a substantial portion of the base surface 22 engages the metal. Once the major part of the base surface is employed, the tool will support itself and become stable until the performance of the tool is accomplished an it penetrates deep enough to release the outer panel from the spot-weld connection.

However, the spot-weld removing tool can operate without the pilot dimple or penetration.

The cutting edge 36 and the cutting tip 42 cut the metal and penetrate deeper into the outside panel 44. In view of the axial relief, the cutting tip 42 first penetrates through the entire thickness of the outside panel 44 in the area thereof around the spot-weld 50. FIG. 4 shows the moment of the operation when the cutting tip 42 fully cuts through the thickness of the outside panel 44. This Figure illustrates that at such moment a part of the cutting edge 36 outside the cutting tip area, does not cut through the thickness of the outside panel. According to the invention, while the cutting tip 42 reaches the interior surface 56 of the outer panel 44, completing a hole 54 (leading to separation of two panels), the rest of the cutting edge 36 forms a slug or disk 52 of the uncut material of the outside panel which is bonded to the inside panel 46 by the spot-weld 50. The slug 52 develops during rotation of the tool in view of the concave recess 27 in the base surface 22.

Since there is a small space 48 (see FIG. 4) between the inside and outside panels, when the operator makes a final penetration through the outside panel, there will be a slight pop effect as the cutting tip 42 enters into such space. This occurs each time the complete hole 54 is drilled, releasing the outer panel from the welded bond. Such pop effect indicates to the operator that the hole is drilled and he needs to stop pushing the drill with the spot-weld removing tool.

The spot-weld itself as well as limited portions of the inside and outside panels bonded by the spot-weld can be considered as one unit of solid material. One of the main objects of this invention is to create a cut or hole 54 around such bonded area of the spot-weld, so that one panel can be removed from the other, leaving the inside panel with at least a part of the spot-weld 50 and the small slug 52 of the outside panel intact. The concave area 27 of the base surface enables the invention to control the cutting action by producing the slug or disk of uncut material 52 of the outside panel, while the cutting tip 42 makes a final penetration through the thickness of the outside panel by entering the space between the two panels.

After separation of the inside and outside panels, the slug 52 bonded to the inside panel 46 by the spot-weld 50, can be removed by grinding or sanding this area of the inside panel.

The slug 52 of the material of the outside panel, which is left over on the inner panel, prevents further penetration of the tool, after the outside panel has been penetrated, thus allowing the removal of the outer panel without having to repair a potential through-hole in the inner panel.

What is claimed is:

1. A cutting tool for disconnecting first and second metallic members joined together by at least one spot-weld, comprising
   a cutting body extending from a front end to a rear end and having an exterior surface;
   a shank connected to said cutting body at said rear end,
   said cutting body having a concave base surface positioned at said front end,
   pilot means extending directly outwardly from said base surface defined by a solid outside surface thereof having conical configuration, so that a concave recess being formed by intersecting each other said concave base surface and said conical outside surface of said pilot means,
   said cutting body having first and second surfaces extending inwardly from the exterior surface, said first and second surfaces intersecting each other to form only a single flute means, said exterior surface of the cutting body being substantially cylindrical except for said single flute means,
   said first surface, said second surface and said flute means extending into said pilot means,
   a cutting edge of said cutting tool formed at intersection of said first surface with said base surface of the cutting body, and
   a cutting tip as formed at a junction of said exterior surface, said base surface and said first surface,
   whereby when said cutting tip penetrates through the entire thickness of said first metallic member in an area of said spot-weld, said cutting edge and said concave recess form a slug of an uncut material from the metal of the first member while said slug being bonded to the second metallic member by said spot-weld.

2. A cutting tool as claimed in claim 1, wherein said first and second surfaces are formed by substantially flat planes.

3. A cutting tool as claimed in claim 2, wherein said first surface is positioned at an acute angle to a longitudinal axis of said cutting tool.

4. A cutting tool as claimed in claim 2, wherein said second surface is positioned at an acute angle to a longitudinal axis of said cutting tool.

5. A cutting tool as claimed in claim 1, wherein said slug controls cutting action by preventing further penetration of the tool into the second metallic member.

6. A cutting tool as claimed in claim 1, wherein a hole is developed around said spot-weld during separation of said first and second members.

7. A cutting tool as claimed in claim 5, whereby said complete slug of the uncut material is produced while the cutting tip makes a final penetration through the thickness of the first member by entering a space between said first and second members.

8. A cutting tool as claimed in claim 1, wherein an angle of the conical pilot means varies from 60° to 120°.

9. A cutting tool as claimed in claim 1, wherein said cutting tool is manufactured from tungsten carbide.

* * * * *